Nov. 29, 1960

J. J. ROCK 2,962,567

SIGNAL PICK-OFF DEVICE

Filed March 5, 1953

INVENTOR.
J.J. ROCK

BY Robert S. Dunham

ATTORNEY

Nov. 29, 1960

J. J. ROCK 2,962,567

SIGNAL PICK-OFF DEVICE

Filed March 5, 1953

INVENTOR.
J. J. ROCK
BY
*Robert S. Dunham*
ATTORNEY

2,962,567

SIGNAL PICK-OFF DEVICE

Joseph J. Rock, Vestal, N.Y., assignor to International Business Machines Corporation, New York, N.Y., a corporation of New York Filed Mar. 5, 1953, Ser. No. 340,460

3 Claims. (Cl. 200—87)

In an Alternating Pulse Type Servo System, such as that disclosed in co-pending application of Ward Leathers, et al., Ser. No. 284,606 filed April 26, 1952, assigned to International Business Machines Corporation, there is employed an electrically controlled device which entails the alternate closing of two circuits. In such a system, when no error condition exists, the duration of this alternate closing of the circuits is equal for each circuit. When an error is introduced to the system, one of the circuits will be closed for longer periods while the other circuit will be closed for correspondingly shorter periods of time. It is for use in a servo system that employs variable duration pulses of this sort that the improved type of pick-off device of this invention is expected to find its primary utility.

It is an object of this invention to provide a magnetic type pick-off device which eliminates all mechanical friction between the pick-off arm controlled by a gyroscope or other means, and the base upon which such gyroscope is mounted.

Another object of this invention is to provide a smooth acting pick-off which, at the same time, provides the positive contact action of an ordinary relay actuated contact type of switch.

To this and other ends, one embodiment of the invention is described below and shown in the drawings, by way of example, illustrating the features and principles of improvement. Referring to the drawings.

Figure 1:
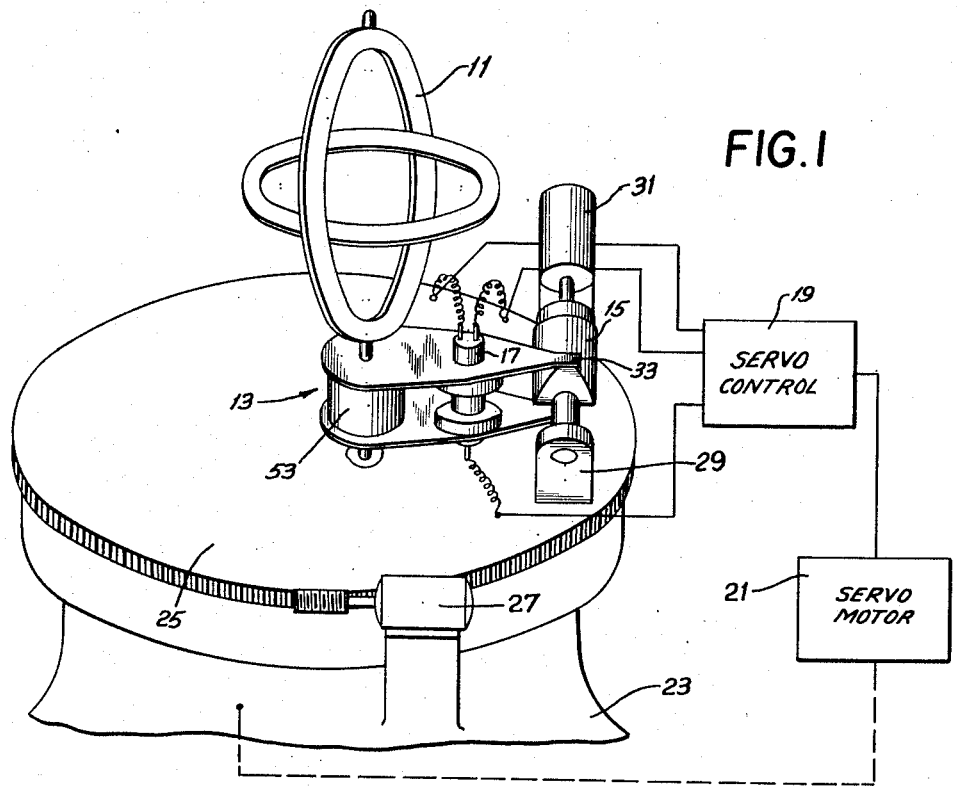
Fig. 1 is a schematic showing in perspective of the pick-off device being used in a servo system.
Figure 2:
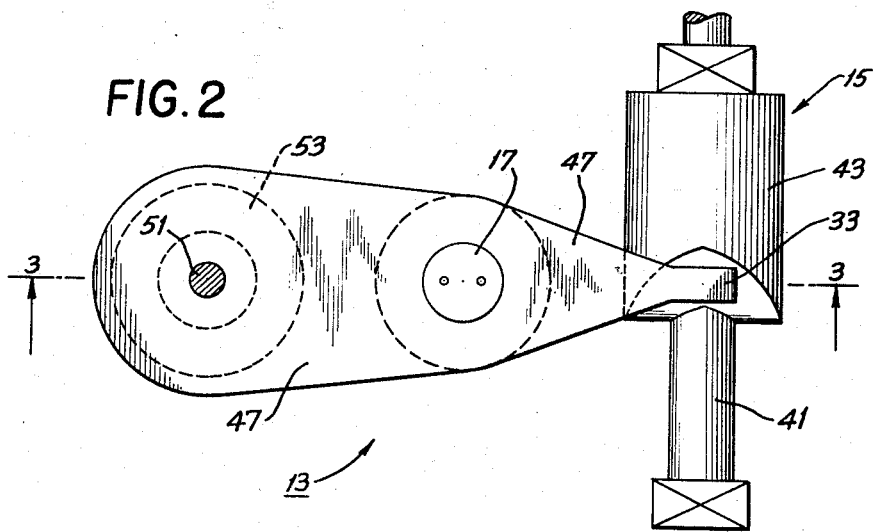
Fig. 2 is an enlarged plan view of the pick-off element and including its rotor.

Referring to Fig. 1, there is illustrated a servo system in which a gyroscope 11, which is schematically illustrated, is direcly connected to and controls the position of a forked arm of a pick-off device 13. The pick-off 13 comprises a rotor 15 and a switch 17 carried on the pick-off arm, to control the alternate closing of a pair of circuits which lead to a servo control unit 19. Control unit 19, in turn, controls a servo motor 21. The servo motor 21 may be any appropriate type of motor device such as a simple hydraulic motor of the type employed in the aforementioned application, Serial No. 284,606, filed April 26, 1952.

The servo motor 21 acts to position some member, e.g. a stabilized body, such as base 23 and this member (which includes base 23) in turn has mounted on it a turntable 25 which may be rotated by means of a motor 27. The pick-off rotor 15 is mounted on turntable 25 in an appropriate manner, such as by means of a pair of brackets 29 (only one of which is illustrated) and which carry the bearings for rotor 15. There is a motor 31 which is also mounted on turntable 25 which acts to continuously drive rotor 15 at a constant rate.

By means of the pick-off device of this invention, when no error signal is present, i.e. when pick-off device 13 in its neutral position as illustrated in all of the figures, switch 17 will be actuated for equal periods of time from one position to the other. Switch 17 is a single pole double-throw switch as will appear in the detailed description hereafter. On the other hand, when an error signal is produced by a displacement of turntable 25 relative to the gyroscope, which has pick-off device 13 rigidly attached thereto; such relative displacement will be about the vertical axis of the gyroscope as shown in Fig. 1, and will cause a displacement of tips 33 of the forked arm of pick-off device 13 relative to pick-off rotor 15. This displacement will cause the duration of the closing of one of the electrical circuits to be increased while the duration of the closing of the other electrical circuit will be correspondingly decreased. The cause of this action will be explained more fully with reference to the remaining figures in the drawings.

The details of the pick-off device 13 will be described in reference to Figs. 2 through 5.

The switch 17 is a single pole double-throw switch which is magnetically actuated against the action of a spring bias. Any appropriate type of switch may be used. However, I prefer to use a standard type of relay switch which is commercially manufactured and which has a sealed glass tube interior portion containing mercury-wetted contacts and kept in a high pressure hydrogen atmosphere. The mercury by means of its wetting action of the contact tips provided beneficial operating qualities among which are the elimination of contact bounce and chatter. The commercial switch has a steel jacketed coil surrounding the glass tube interior. I make use of only the interior, sealed glass portion of such a switch in order to adapt it to my pick-off device. The switch 17 is so constructed that its central contact is spring biased to the position illustrated in Fig. 4 and will be acuated by means of magnetic force to the position illustrated in Fig. 3.

Figure 3:
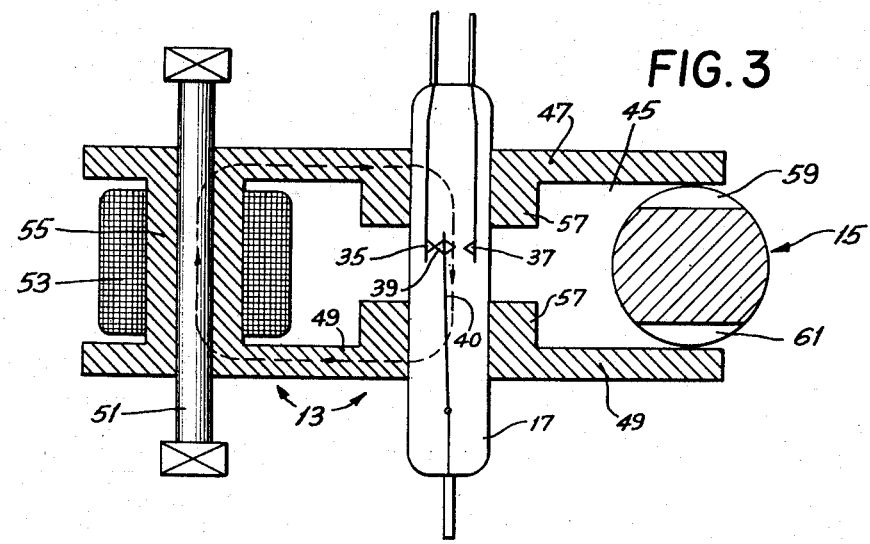
Figs. 3 and 4 are cross-section views of the pick-off as illustrated in Fig. 2 taken along the line 3—3 showing two conditions of operation of the pick-off.
Figure 4:
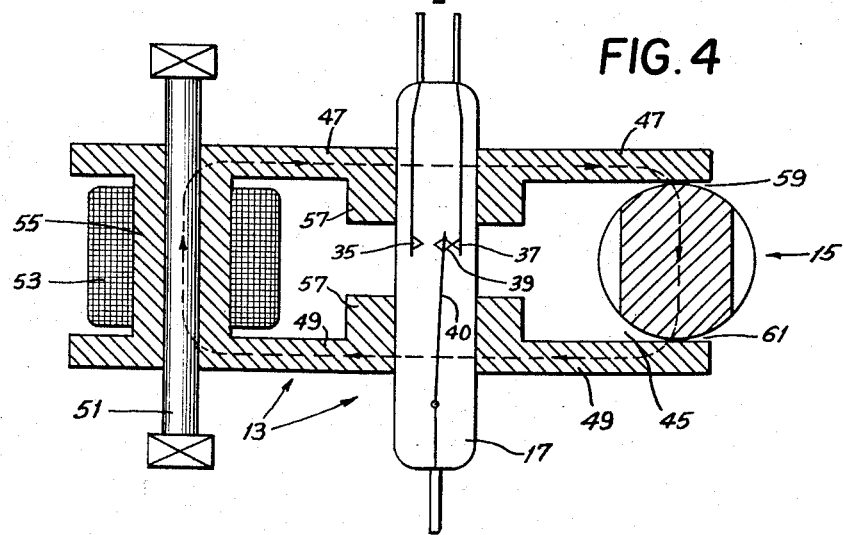
Figure 5:
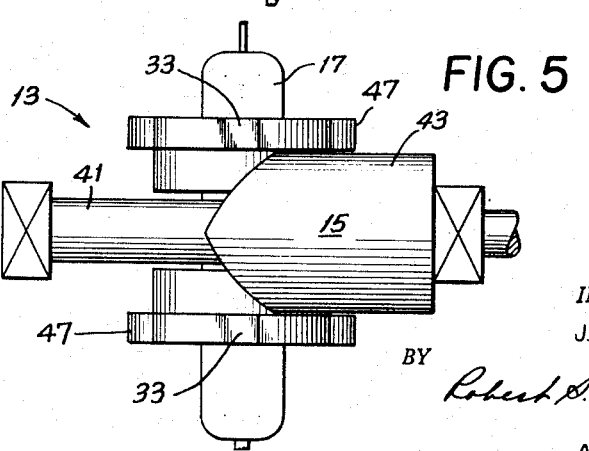
Fig. 5 is an elevation taken at the rotor end of the pick-off.

The switch has a pair of contacts 35 and 37 which are alternately engaged by a central contact 39. Contact 35 and central contact 39 are largely constructed of a magnetic material so that, in the presence of a magnetic field, these two contacts (35 and 39) will be attracted to one another and the switch will be actuated to the position illustrated in Fig. 3. Central contact 39, however, is carried by a leaf-type spring member 40 which is biased to the right as viewed in Figs. 3 and 4, so that, in the absence of a magnetic field, central contact 39 engages the other contact 37 as illustrated in Fig. 4.

The rotor 15 is carried by suitable bearings schematically illustrated and has a reduced portion 41 which is considerably smaller in diameter than the other half 43, of rotor 15. This large diameter portion 43 is of such a size that it fits closely within a space 45 formed between the tips 33 of pick-off device 13. The size of the clearance between this large diameter portion 43 and the parallel surfaces of the tips 33 (which form the space 45) determines the size of the minimum air gaps between the rotor 15 and a pair of extensions or arms 47 and 49, as best illustrated in Fig. 4. The purpose of these air gaps will be explained fully below. Pick-off device 13 is made up of a pair of elongated finger-like extensions 47 and 49 which form the two forks of the arm of the pick-off.

The whole pick-off device 13 is pivoted at appropriate bearings on a shaft 51 to which the pick-off device is rigidly attached. Shaft 51 is rigidly connected to the gyroscope 11, in order to have the pick-off 13 positioned by the gyroscope.

There is a magnetic source 53, which may be an electro-magnet or a permanent magnet, which surrounds a central core 55 of the pick-off 13. Pick-off 13, including extensions 47 and 49, and tips 33, is constructed of highly permeable magnetic material in order to provide a low reluctance path which will concentrate the flux generated by magnetic source 53. On the inside of the extensions 47 and 49, there is a pair of hubs 57 which surrounds and supports the switch 17 therein.

It will now be clear that there is a low reluctance path for the flux generated by magnet 53 which path contains two major air gaps therein. One of these air gaps is that formed by switch 17, while the other air gap is made up of two variable air gaps 59 and 61 which comprise the space between the tips 33 on the ends of extensions 47 and 49, and rotor 15. The configuration of rotor 15 is as illustrated which affords an adjoining area between the reduced portion 41 and the other half 43 of the rotor 15. This adjoining section is shaped as illustrated so that, when pick-off 13 is in its neutral or no error position, i.e. that illustrated in Figs. 2 to 5, the variable air gaps 59 and 61 change from the minimum air gaps as illustrated in Fig. 4 to the maximum air gaps as illustrated in Fig. 3. The effect thus produced is to alternately shunt the magnetic flux through the rotor 15 and hence open the circuit between contact tips 35 and 39 and close the circuit between contact tips 37 and 39; and to allow the flux to flow through switch 17 and hence reverse the position of contact tip 39. The action produced is clearly illustrated in Figs. 3 and 4. In Fig. 3, switch 17 is shown actuated by the magnetic flux, while, in Fig. 4, the magnetic flux is shunted away from switch 17. When the switch is magnetically actuated, contact 39 makes with contact 35, and when the flux is shunted and the spring bias is effective contact 39 makes with contact 37.

It will now be evident that, whenever the forked arm made up of extensions 47 and 49 of pick-off 13 is pivotally displaced relative to rotor 15 (and turntable 25), the tips 33 will be shifted longitudinally toward or away from the large diameter portion 41 of rotor 15. This means that the relative duration of shunting and non-shunting conditions during each revolution of rotor 15 will be varied and consequently the relative duration of closing the circuits of contacts 37 and 35 re pectively will likewise be varied. These are the conditions of the servo system when a signal is present, and the effect on the servo system will be to actuate the servo motor 21 in a direction tending to reduce the signal to zero, i.e. return the pick-off 13 to its neutral position as illustrated where the periods of closing of the two circuits containing contacts 35 and 37 are equal for each revolution of rotor 15. If the signal is of a magnitude that the rated range is exceeded, the tips 33 will swing far enough to produce a continuous shunting—when the large diameter portion 43 of rotor 15 is continuously between tips 33—or a continuous non-shunting—when the reduced portion 41 is continuously between the tips—and one circuit or the other will remain closed while the opposite circuit remains open. It will be clear that the shape of rotor 15 may be such as to give any desired response characteristics with regard to the angular displacement of the pick-off 13, e.g. the shaped zone of rotor 15 between large diameter portion 43 and reduced portion 41 may be made wider or narrower than that illustrated, if desired. The shaped zone is formed with two faces which join the large diameter portion 43 to the reduced portion 41. Each face is a surface bound by the intersection of a larger diameter cylindrical surface, the axis of which cylinder is at right angles to the axis of rotor 15, with the portion 43 of rotor 15. Some other shape might be employed, if desired, to obtain a different response of the pick-off for a given angular displacement.

While I have shown and described what I now consider to be a preferred embodiment of my invention, in accordance with the applicable statutes, numerous other embodiments will be suggested to one skilled in the art and my disclosure is to be considered as illustrative only and not as limiting my invention in any way.

I claim:

1. A magnetic type pick-off device, comprising a source of magnetic flux, a bifurcated magnetic material member carrying the flux and having a pair of gaps in the path of the flux, a magnetically actuated switch in one of said gaps, a magnetic material rotor in the other of said gaps, means for driving said rotor at a constant rate, said rotor having a large diameter portion and a reduced portion, said large diameter portion forming minimum gaps for said flux path in order to shunt the flux from said switch, and pivot means for said bifurcated member about an axis perpendicular to the rotational axis of said rotor so that the relative duration of shunting and non-shunting of the flux during each revolution of the rotor may be varied.

2. A magnetic type pick-off device, comprising a source of magnetic flux, a bifurcated magnetic material member having extended finger-like extremities, a first gap formed between said extremities, a magnetic material rotor located in said first gap and having a reduced diameter portion, a second gap between the branches of said bifurcated member, a magnetically actuated switch in said second gap, means for rotating said rotor at a constant rate, said rotor having a shaped zone normally located between said extremities for providing a variation in the magnitude of said first gap, pivot means for rotating said bifurcated member about an axis at right angles to the rotational axis of said rotor so that the relative duration of the variations in magnitude of said first gap may be varied, and means responsive to a condition for determining the pivotal position of said bifurcated member relative to said rotor.

3. A magnetic type pick-off device comprising a source of magnetic flux, a low reluctance path for said flux having a pair of high reluctance gaps therein, a magnetically actuated switch in one of said gaps, a magnetic material rotor in the other of said gaps, means for driving said rotor at a constant rate, said rotor having a configuration such that the other gap is periodically reduced to a minimum during each revolution of said rotor to shunt the flux and deactuate said switch during the minimum gap conditions, and means for relatively displacing said rotor and said low reluctance path in a lateral direction to vary the relative duration of actuation and deactuation of said switch in response to such displacement.

References Cited in the file of this patent

UNITED STATES PATENTS

| | | |
|---|---|---|
| 2,381,826 | Levy-Savoye | Aug. 7, 1945 |
| 2,484,022 | Esval | Oct. 11, 1949 |
| 2,493,388 | Candy | Jan. 3, 1950 |
| 2,560,814 | Nilson | July 17, 1951 |
| 2,550,605 | Schenck | Apr. 24, 1951 |